(12) United States Patent
Gribble et al.

(10) Patent No.: US 7,122,119 B2
(45) Date of Patent: Oct. 17, 2006

(54) SIEVE SEPARATOR

(76) Inventors: Donald L. Gribble, P.O. Box 30940, Reno, TX (US) 75462; Ted A. Gribble, P.O. Box 30940, Reno, TX (US) 75462

( * ) Notice: Subject to any disclaimer, the term of this patent is extended or adjusted under 35 U.S.C. 154(b) by 0 days.

(21) Appl. No.: 10/313,606

(22) Filed: Dec. 5, 2002

(65) Prior Publication Data
US 2003/0127375 A1    Jul. 10, 2003

Related U.S. Application Data

(60) Provisional application No. 60/415,171, filed on Sep. 30, 2002, provisional application No. 60/357,534, filed on Feb. 14, 2002, provisional application No. 60/337,420, filed on Dec. 6, 2001.

(51) Int. Cl.
  *B01D 29/03*   (2006.01)
  *B01D 29/56*   (2006.01)
(52) U.S. Cl. .................. 210/232; 210/335; 210/409; 210/499
(58) Field of Classification Search .............. 210/95, 210/162, 232, 250, 255, 261, 323.1, 328, 210/332, 335, 339, 409, 433.1, 456, 498, 210/499; 209/353, 354, 355, 408, 412, 413, 209/414, 420
See application file for complete search history.

(56) References Cited

U.S. PATENT DOCUMENTS

| | | | | |
|---|---|---|---|---|
| 1,104,772 A | * | 7/1914 | Black | 210/339 |
| 2,682,205 A | * | 6/1954 | Vincent | 209/273 |
| 3,429,782 A | * | 2/1969 | Hicks et al. | 435/291.1 |
| 3,875,319 A | | 4/1975 | Seckler et al. | |
| 3,919,433 A | | 11/1975 | Senior | |
| 3,966,607 A | | 6/1976 | Gaynor et al. | |
| 4,018,899 A | | 4/1977 | Seckler et al. | |
| 4,117,175 A | | 9/1978 | Senior | |
| 4,300,445 A | * | 11/1981 | Hazen | 99/458 |
| 4,319,993 A | * | 3/1982 | Krause | 209/315 |
| 4,376,044 A | * | 3/1983 | Ditzenberger | 209/234 |
| 4,661,253 A | * | 4/1987 | Williams | 210/411 |
| 4,666,602 A | | 5/1987 | Hartzell | |
| 5,268,100 A | | 12/1993 | Hartzell | |
| 5,333,738 A | * | 8/1994 | Fuchs et al. | 209/38 |
| 2001/0013492 A1 | * | 8/2001 | Dias | 210/409 |

* cited by examiner

*Primary Examiner*—Matthew O. Savage
(74) *Attorney, Agent, or Firm*—Kolisch Hartwell, PC (57) ABSTRACT

A sieve separator and a method of slurry separation that uses two or more levels of filtration screens. In some embodiments, the filtration screens on different levels may be used to separate solids of various sizes at each level.

18 Claims, 10 Drawing Sheets

SIEVE SEPARATOR

CROSS-REFERENCE TO RELATED APPLICATIONS

This application claims priority from U.S. Provisional Patent Application Ser. No. 60/337,420, filed Dec. 6, 2001; U.S. Provisional Patent Application Ser. No. 60/357,534, filed Feb. 14, 2002; and U.S. Provisional Patent Application Ser. No. 60/415,171, filed Sep. 30, 2002, all of Donald L. Gribble and Ted A. Gribble for a SIEVE SEPARATOR, the disclosures of which are hereby incorporated by reference.

SUMMARY AND BACKGROUND OF THE INVENTION

The present invention relates to solids extraction from a liquid/solid slurry, and more particularly, to a sieve separator and a method of slurry separation that uses two or more levels of filtration screens. In some embodiments, different spacing in the filtration screens on different levels may be used to separate solids of various sizes at each level.

Manure produced at a feedlot or dairy barn must be removed regularly to ensure adequate sanitation and to prevent disease. One manure removal method is to flood the feedlot or barn floor with water, in order to wash away the manure. The resulting effluent is a liquid/solid manure slurry that typically is directed through pipes or channels to a manmade slurry pond, where the solids and particulates settle to the bottom of the pond. The liquid may be drained and recycled, and the solids may be removed and used as fertilizer.

There are at least two significant types of problems associated with the conventional use of slurry ponds as described above. One set of problems is generally associated with the high proportion of solids in the unseparated slurry, which may clog or otherwise impede the slurry as it passes through the channels or pipes to the slurry pond. Also, assuming that the slurry reaches the slurry pond, it is time-consuming and expensive to remove the significant proportion of solids that have subsequently settled to the bottom. The monitoring and removal of these solids from the bottom of the ponds forces workers to work for extended periods of time in an environment where large amounts of methane, ammonia and sulfur are produced by the decomposing manure. These gases not only create potentially dangerous working conditions, but also contribute to the pollution of the environment.

Another set of problems associated with the conventional use of slurry ponds is related to the prolonged mixing of solid and liquid wastes in the pond. This tends to result in the transfer of a significant amount of nutrients from the solid to the liquid, so that the solids become depleted of nutrients that may be desirable in a manure fertilizer, and the liquids become loaded with nitrogen, phosphorous and salts to such an extent that they must be either limited in their irrigation use, or mixed with fresh water to lower the proportion of these substances. In other words, the useful qualities of both the solid and liquid portions of the slurry mixture are degraded over time in a conventional slurry pond.

To solve these problems, machines have been developed that attempt to remove a significant proportion of the solids in manure slurry, prior to placing the slurry in a pond. One such machine, which will be referred to as a sloped-screen slurry separator, uses a sloped, wedge wire filtration screen to filter out the solids. In such a separator, the filtration screen has apertures configured to stop the passage of solids that exceed the aperture size, and to allow the passage of solids smaller than the aperture size. In this context, "sloped-screen" refers to the fact that the filtration screen is configured to have a non-horizontal orientation with respect to the surface of the ground, so that gravity may assist in the flow of the manure slurry over the filtration screen. A single filtration screen may include apertures of various sizes, to filter out different sized solids at different positions along the screen. In general, however, a filtration screen as referred to herein is any device configured to filter out some portion of solids from a mixture of solids and liquids.

An example of the type of slurry separator known in the prior art is found in U.S. Patent Publication Number US 2001/0013492 A1, entitled SLOPED SCREEN SEPARATOR THAT REMOVES SOLIDS FROM A MANURE SLURRY, filed on Mar. 30, 2001, the disclosure of which is incorporated herein by reference. Other examples of similar types of separators are found in U.S. Pat. Nos. 3,875,319; 3,919,433; 3,966,607; 4,018,899; 4,117,175; 4,666,602; 5,268,100; and 5,720,393, the disclosures of which are incorporated herein by reference.

However, such sloped-screen separators may not remove a sufficient proportion of the solids from the manure slurry in a single separation attempt. Therefore, multiple separators must sometimes be used, with the manure slurry passing from one to another in series. Since each separator requires its own construction, pumping and mounting provisions, the use of multiple separators in this manner entails a greater cost than the use of a single separator. Furthermore, transporting the partially separated slurry from one separator to another may lead to problems of pipe clogging as described previously.

In previous sloped-screen separators, a concentrated flow of slurry is typically pumped to a fine filtration screen, leading to almost immediate partial clogging of the filtration screen. The result is that pressure quickly builds up near the bottom of the sloped filtration screen, causing the slurry to back up and possibly overflow the sides of the filtration screen and/or the separated manure solids on the filtration screen. In particular, "streamers" occur when a section of filtration screen gets partially clogged, causing the slurry to run over the top of the filtration screen instead of filtering through it. This in turn causes the slurry to flow directly into the separated solids stack further down the sloped filtration screen, undermining the purpose of the separator.

Furthermore, it is often difficult to clean the filtration screens of previous sloped-screen separators. One reason for this is that in existing separators, fine solid particles typically reside at the bottom of each solids stack. Such fine particles are more fluid that larger solids, so that the resulting stack may be relatively unstable and difficult to remove efficiently. Existing separators are therefore often operated while partially clogged with solids, leading to a degradation of their functionality, and increased downtime and expense for frequent cleaning attempts.

Due to the problems outlined above, there is a need for a manure slurry separator that efficiently separates solids from liquids without the undue expense of constructing multiple sloped-screen separators, that avoids frequent clogging, and that can be relatively easily cleaned.

DETAILED DESCRIPTION OF THE INVENTION

The present invention is designed to overcome the problems of previous methods and apparatus for manure slurry separation, by comprising a plurality of levels of filtration screens. In general, the present invention will therefore comprise at least the functionality of two or more standard sloped-screen separators acting in series. This will save construction time and capital investment over a system using two or more single filtration screen devices, each of which requires its own support structure, as well as related pumps and equipment. Furthermore, a single separator with multiple levels of filtration screens may not only cost less, it may also take up less space than multiple single filtration screen systems.

Figure 1:
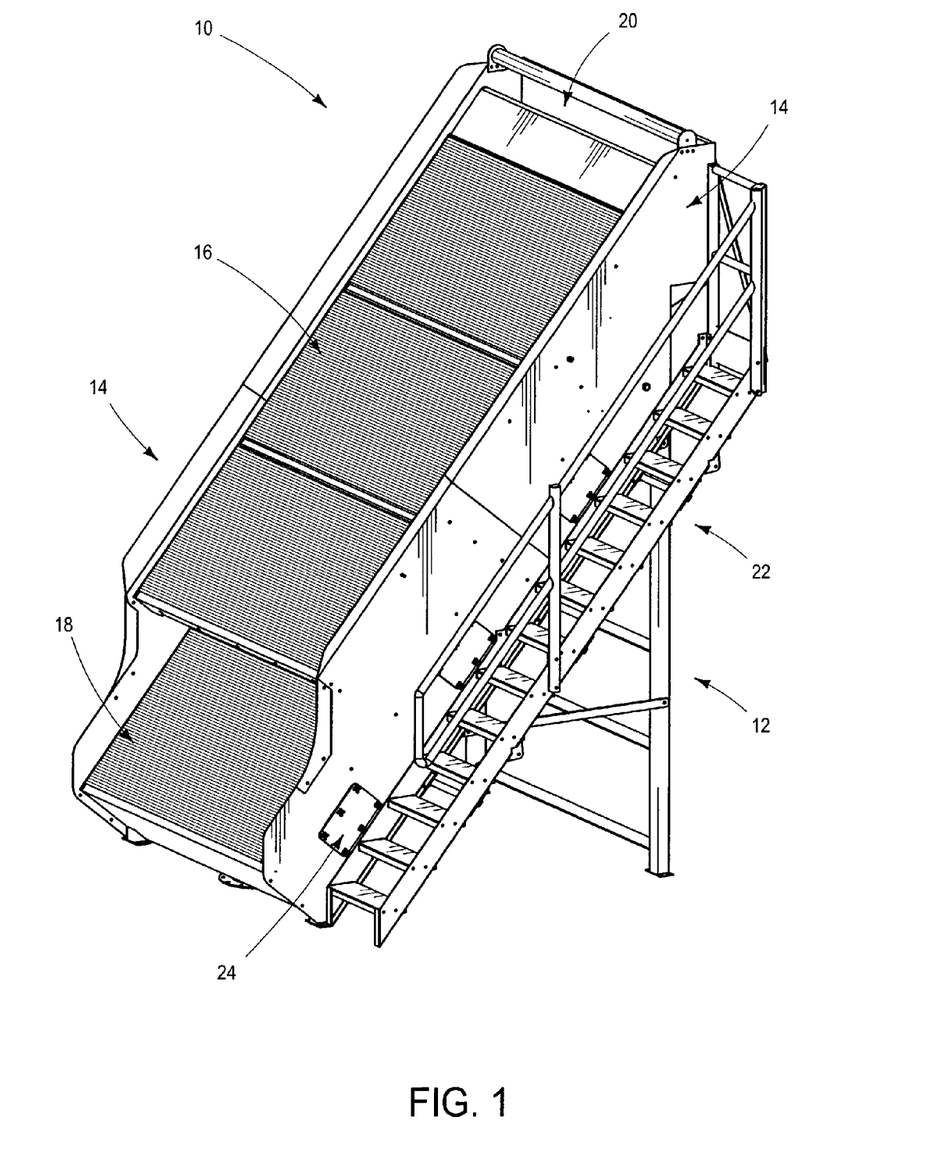
FIG. 1 is an isometric view of one embodiment of a sieve separator according to the present invention, including multiple levels or rows of filtration screens for solid separation.

FIG. 1 shows an isometric view of a multi-level slurry separator 10. This apparatus generally comprises support structure 12, upper filtration screens 16, and lower filtration screens 18, in accordance with aspects of the invention. Support structure 12 may comprise a bottom wall (not shown in FIG. 1), side walls 14, and various other supporting beams and members that give separator 10 a well-defined and stable shape, and that support screens 16 and 18 within the apparatus. Support structure 12 further comprises a slurry intake opening through which unseparated or partially unseparated manure slurry enters the apparatus, and a slurry outflow opening through which at least partially separated manure slurry exits the apparatus. Separator 10 may further comprise a slurry intake region 20, defined in shape by the components of support structure 12, where manure slurry may be confined within the apparatus before encountering filtration screens 16 and 18.

Although only two levels of filtration screens are shown in FIG. 1, it should be noted that separator 10 might in general comprise two or more levels of filtration screens, where each level includes at least one filtration screen. A filtration screen as referred to herein comprises any generally planar surface that includes apertures through which various components of a manure slurry may pass, while other components of the slurry remain at least temporarily on the surface of the screen. The filtration screens of the present invention may be constructed of wedge wire, stainless steel bars, or any other suitable material. The screens may be constructed by the connection of various wires or bars (through welding, for example), or the screens may be solid materials through which apertures are punched or cut. The wire, bars, or other screen construction material may be 0.05 inch to 0.125 inch thick, or it may have other suitable dimensions, depending on the material and/or the application for which a particular embodiment of the invention is intended.

The aperture sizes in the filtration screens should also be chosen to best facilitate the intended use of each embodiment of the invention. For example, relatively larger aperture dimensions may be chosen if the embodiment is to be used to separate cattle slurry, and relatively smaller aperture dimensions may be chosen if the embodiment is to be used to separate swine slurry. For most practical embodiments, various shaped apertures that have a smallest dimension from 0.005 inch to 0.120 inch may be used. For example, one preferred embodiment may utilize rectangular apertures with 0.035 inches as the smallest dimension of the upper screen aperture, and 0.010 inches as the smallest dimension of the lower screen aperture. Another preferred embodiment may utilize rectangular apertures with 0.060 inches as the smallest dimension of the upper screen aperture, and 0.020 inches as the smallest dimension of the lower screen aperture.

In some embodiments, separator 10 may also comprise stairs 22, and viewing/cleaning ports 24, which may be used to easily examine and clean the interior of separator 10. Ports 24 may be constructed from a strong, transparent material such as Plexiglas, or from any other suitable material. Ports 24 may also be openable and of a size generally suited for the insertion of cleaning implements along with the head, arms, and/or torso of a human operator or maintenance worker. Stairs 22 provide access to separator 10 and to ports 24, so that viewing of the separation process and/or maintenance of the separator may take place.

Still referring to FIG. 1, the separation process begins when unseparated slurry is pumped or otherwise enters separator 10 through an intake opening (not shown in FIG. 1). The intake opening should be conveniently located in support structure 12, and should be of a general size and shape to facilitate the passage of manure slurry into the separator. For example, the intake opening may be circular and approximately 3 inches to 3 feet in diameter, depending on the type of manure slurry to be separated. After passing through the intake opening, the manure slurry may pass into intake region 20, the size and shape of which are determined by the design of support structure 12, and which confines the slurry and may serve to distribute it uniformly to the first filtration screen. The manure slurry then passes to upper filtration screens 16. Filtration screens 16 serve to partially separate the slurry by removing the larger solids, which remain at least temporarily on filtration screens 16 while the remainder of the slurry passes through the apertures to lower filtration screens 18. Filtration screens 18 filter the slurry again, removing more solids and allowing the now mostly liquid slurry to pass either to additional, lower levels of filtration screens, or directly to a slurry outflow opening (not shown in FIG. 1). The outflow opening should be conveniently located in the lower portion of support structure 12, so that slurry that has passed through filtration screens 16 and 18 will naturally arrive at or near the opening. The outflow opening should also be of a general size and shape to facilitate the passage of slurry out of separator 10. For example, the outflow opening may be circular and approximately 3 inches to 3 feet in diameter, depending on the type of manure slurry that has passed through the separator.

Figure 2:
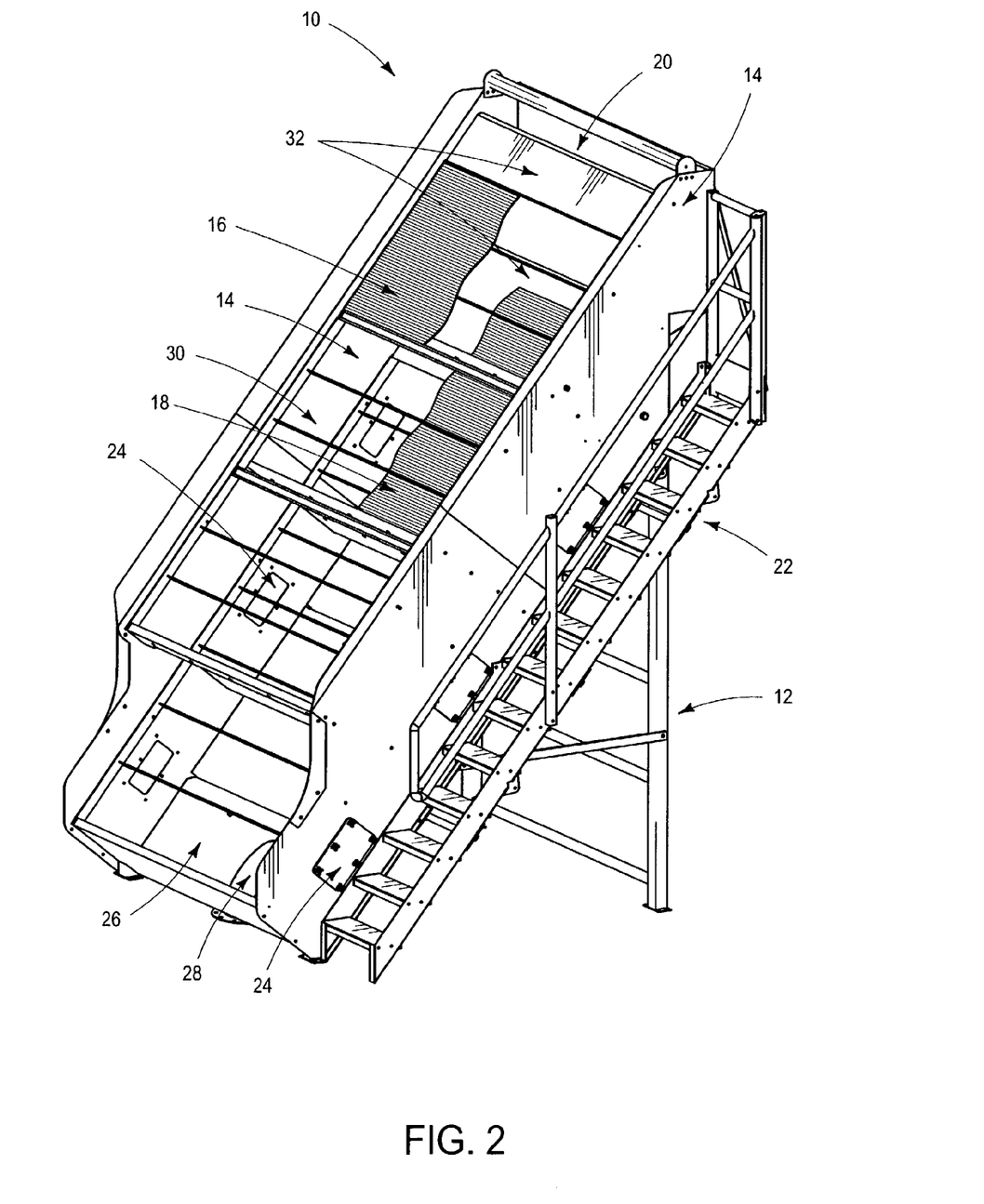
FIG. 2 is an isometric view of one embodiment of a sieve separator according to the present invention, where some of the filtrations screens are removed and others are represented as partially cut away, revealing the underlying support structure of the separator.

FIG. 2 shows separator 10 with some filtration screens removed and others represented as partially cut away, so that distal side wall 14, bottom wall 26, and slurry outflow opening 28 can be seen. One purpose of walls 14 and 26, which are part of support structure 12, is to confine the slurry to the separator until it has been separated to the desired degree, at which point the liquids drain or are pumped through outflow opening 28, and the solids fall with the aid of gravity, or are otherwise removed from, filtration screens 16 and 18. Also shown are horizontal support members 30, also part of support structure 12, which may be used to support filtration screens 16 and 18, and to hold them in place.

In some embodiments, solid panels 32 may be included in support structure 12, and used to direct the flow of liquids and/or solids to filtration screens 16 and 18. In FIG. 2, one upper filtration screen 16, represented as partially cut away, is shown abutting, but not overlapping, upper solid panel 32. On the other hand, one lower filtration screen 18, also represented as partially cut away, is shown partially overlapping lower solid panel 32. In general, the filtration screens may be disposed relative to the solid panels in various ways so as to allow manure slurry to pass from the solid panels to the screens in a directed manner. This directed flow may result in a more uniform arrival of liquids to the screens. Alternatively, in some embodiments it may be desired to remove panels 32 so that liquids fall intermittently on the filtration screens. This intermittent delivery of liquid to the filtration screens may result in a "raining" effect that assists in the removal of solids from the filtration screens.

Figure 3:
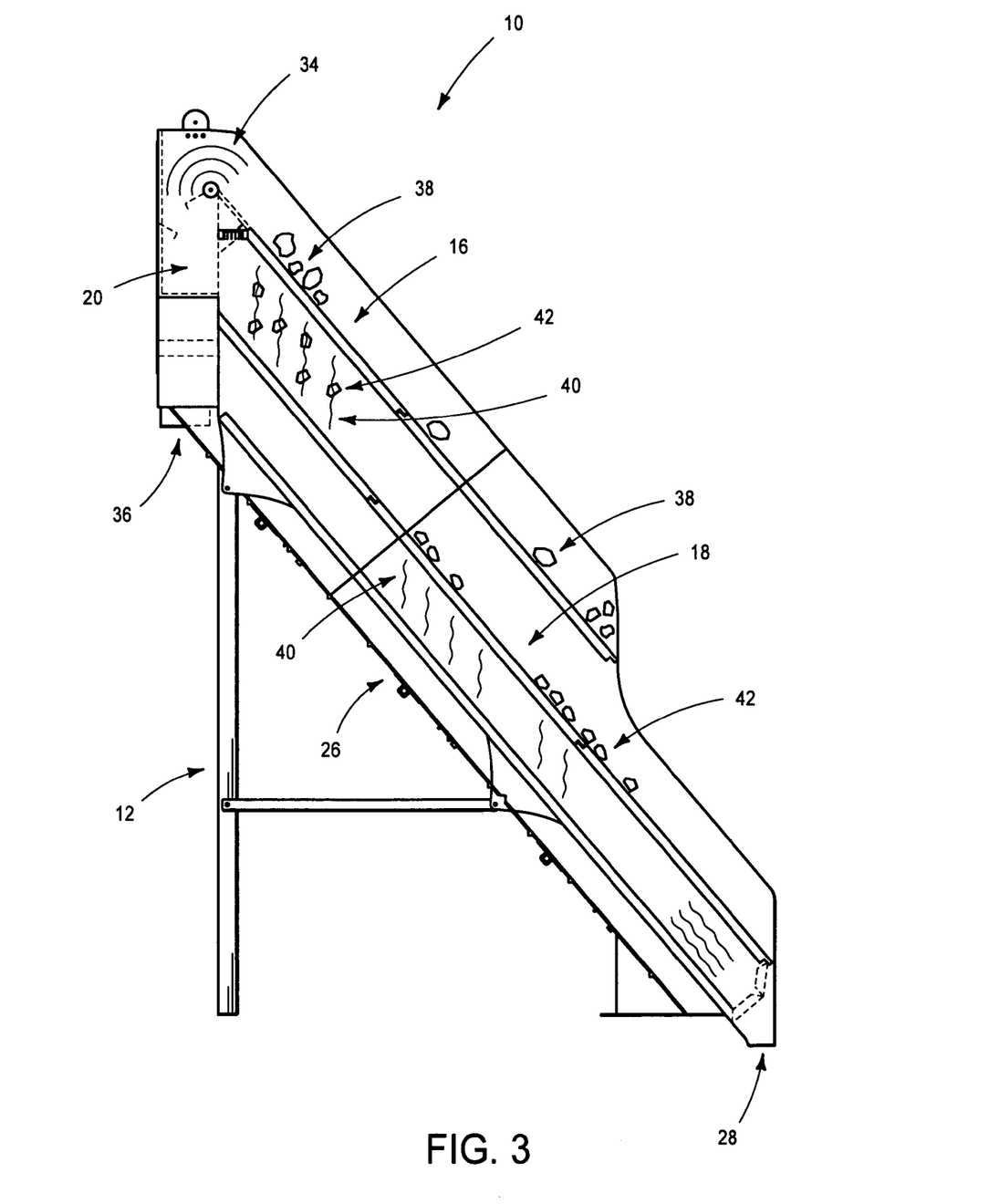
FIG. 3 is a side elevation of a sieve separator, showing some details of a typical slurry separation process, in accordance with aspects of the invention.

FIG. 3 shows a side cross-sectional view of separator 10, and illustrates a typical slurry separation process. Unseparated slurry 34 is pumped or otherwise passes through intake opening 36 and into intake region 20. Slurry 34 then passes onto upper level filtration screens 16, at which point large solids 38 are separated. The remaining slurry, consisting of liquid 40 and smaller solids 42, passes through upper filtration screens 16 and arrives at lower level filtration screens 18. Lower filtration screens 18 further separate the slurry, allowing liquid 40 to pass towards the bottom of the separator, where it flows through outflow opening 28, while solids 38 and 42 remain inside the support structure of the separator.

Figure 4:
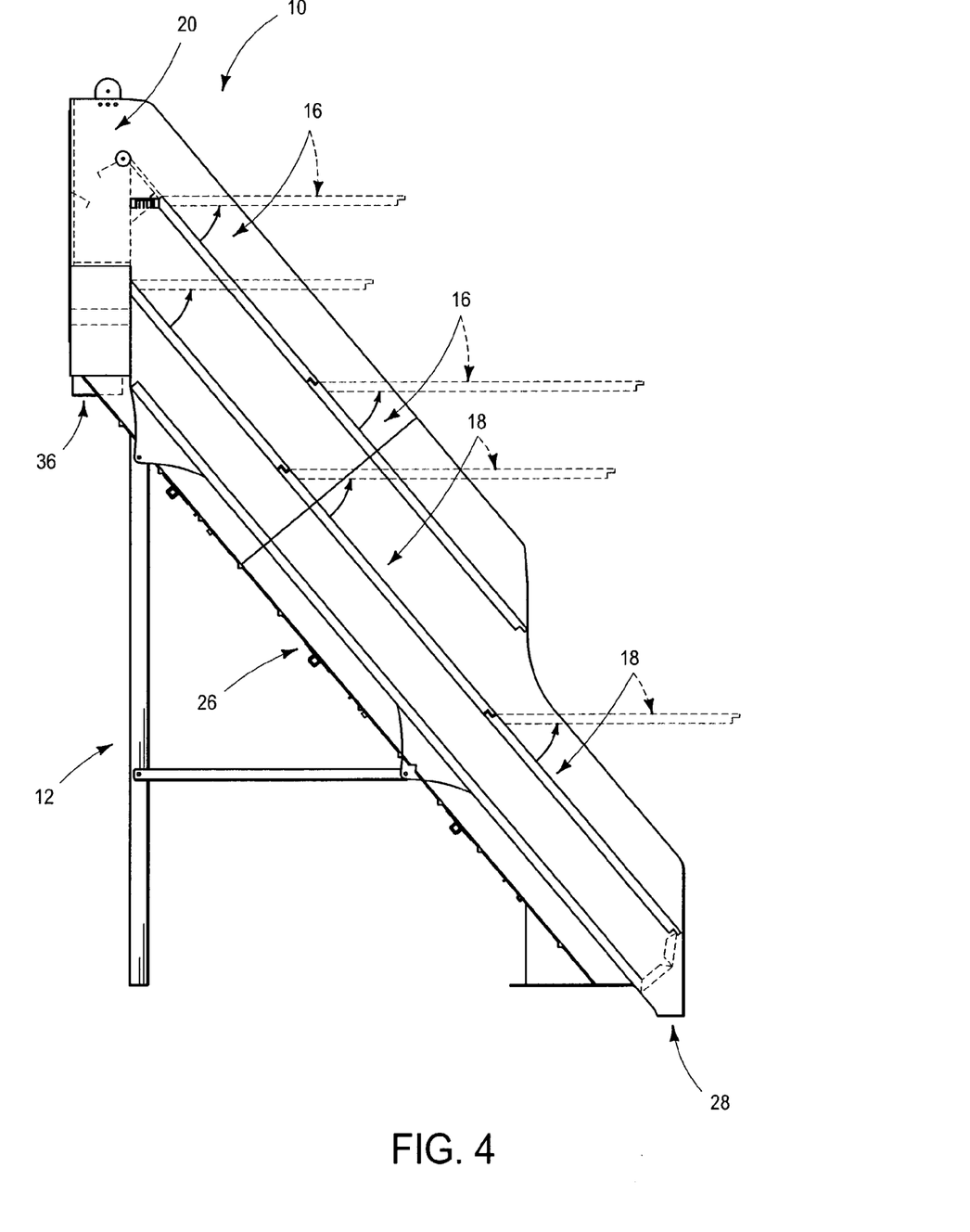
FIG. 4 is a side elevation of a sieve separator, where rotation of the filtration screens is shown.
Figure 5:
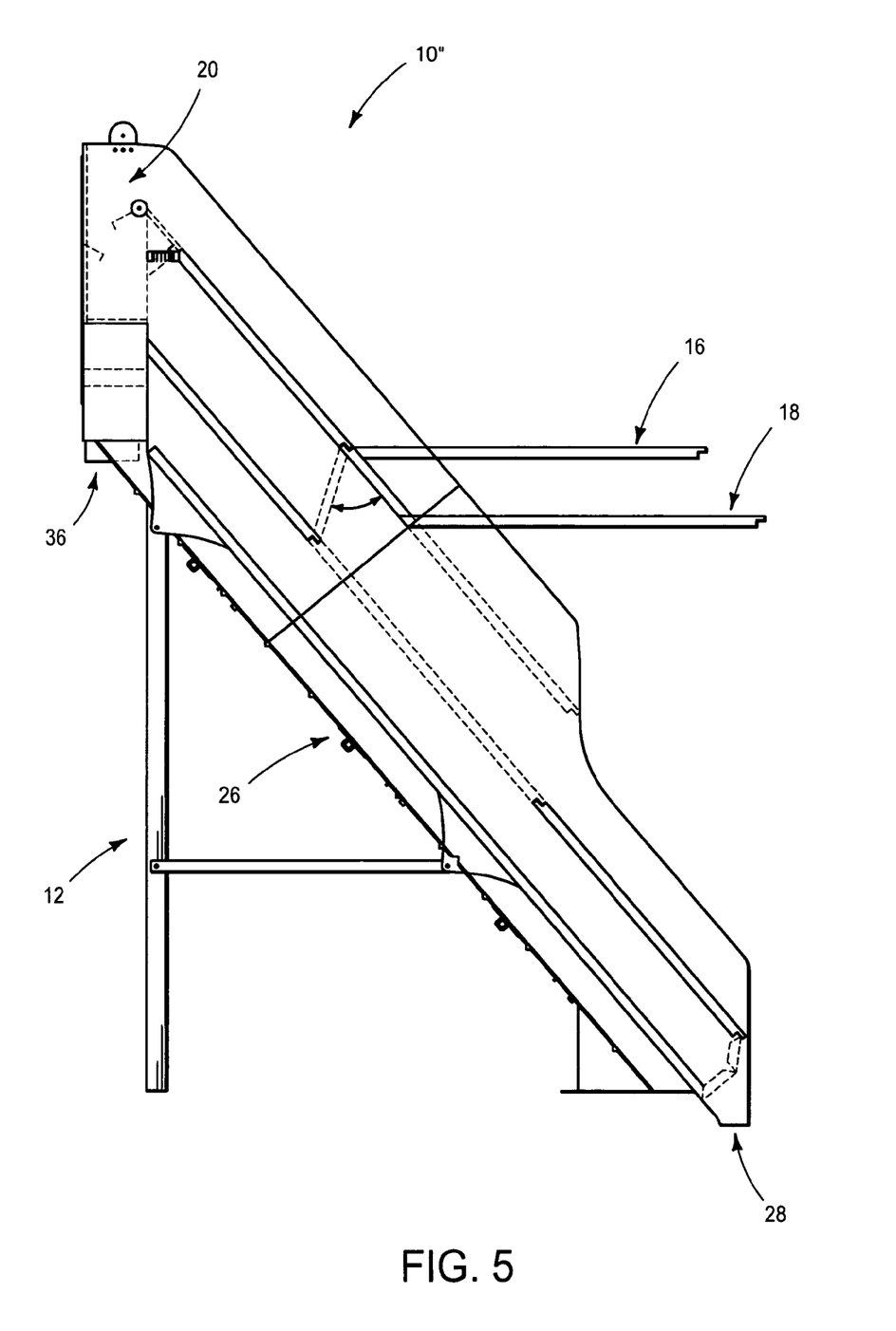
FIG. 5 is a side elevation of a sieve separator, where another type of rotation of the filtration screens is shown.

Once the slurry has been separated, solids 38 and 42 may be removed from separator 10 in various ways. In a preferred embodiment, filtration screens 16 and 18 may tilt or rotate upwards. FIG. 4 shows a side cross-sectional view of separator 10, including the possible rotation of filtration screens 16 and 18. Once the filtration screens have been rotated, they are clear of the separator support structure, and the solids may be easily removed from them either manually or with the aid of a machine, possibly using stairs 22 and/or ports 24 to gain access to all of the filtration screens. The exact rotation mechanism may be chosen in various ways so as to maximize the efficiency of the sol removal and filtration screen cleaning for a particular application. For example, FIG. 5 shows a side cross-sectional view of another preferred embodiment of the invention, (indicate as separator 10"), in which one of upper filtration screens 16 is coupled to one of lower filtration screens 18, so that the two coupled filtration screens rotate about a common axis, and may therefore be rotated upwards together.

Figure 6:
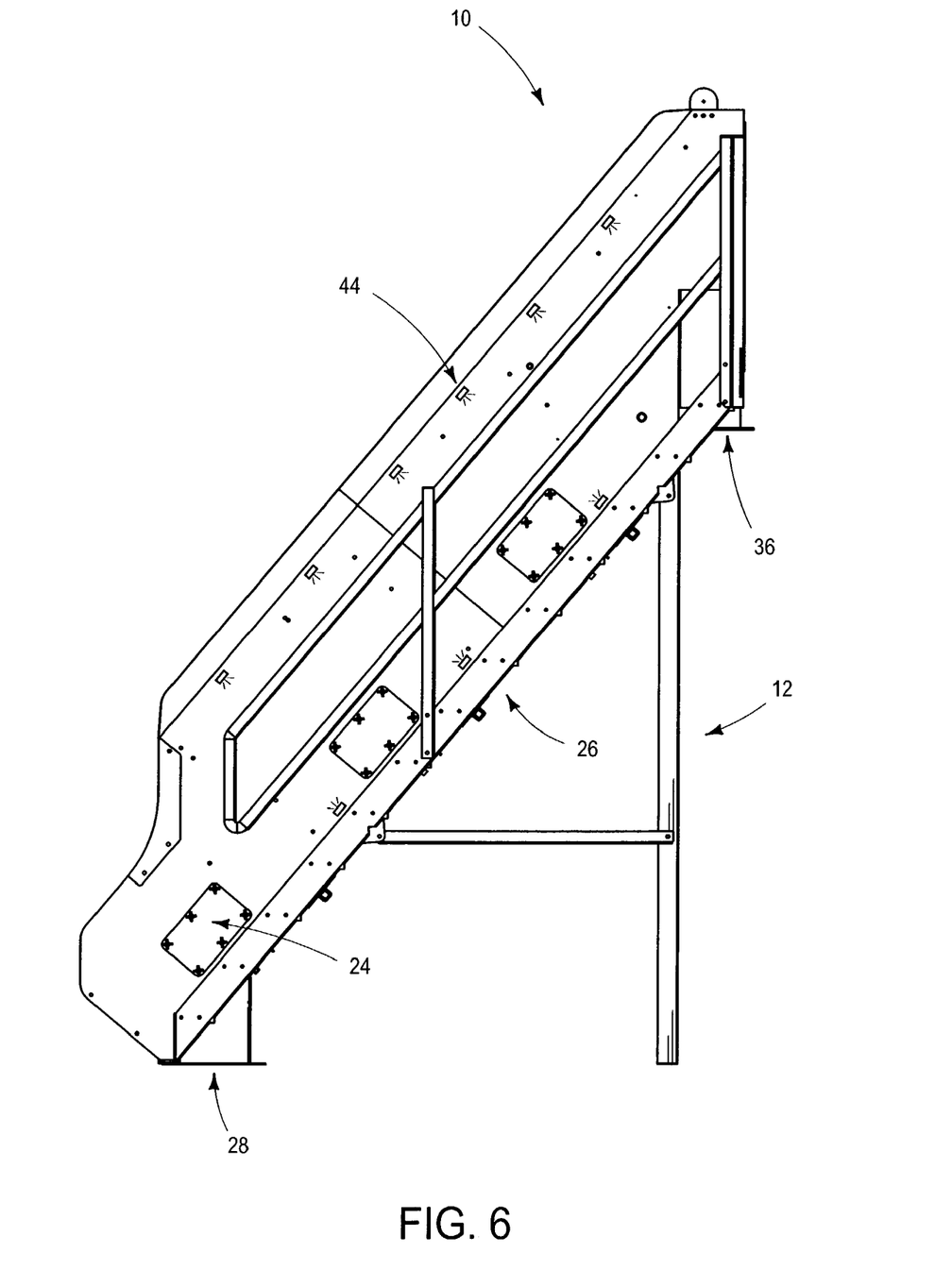
FIG. 6 is a side elevation of a sieve separator, showing one possible location of sprinkler heads and cleaning/viewing ports.

The removal of separated solids from the separator may be further facilitated by locating fixed and/or moveable sprayers at convenient points on support structure 12, and then periodically spraying the walls and/or filtration screens of the separator with air, water or with any other suitable substance such as an organic solvent, or a mixture of water and an organic solvent. Examples of suitable organic solvents include chlorinated hydrocarbons, glycols, glycol ethers, esters, ethers, or mixtures thereof. FIG. 6 shows another side cross-sectional view of separator 10, in which the separator comprises fixed or moveable sprinkler heads or other spraying devices 44 that can assist in flushing the liquids and/or solids down towards the bottom of the filtration screens, or to the bottom wall 26 of the separator, for removal. In a preferred embodiment, sprayers 44 spray air, because this may make the solids dryer as they exit the sieve separator, thereby aiding in the liquid/solid separation. However, any other suitable media that aids the separation process may be used. The embodiment shown in FIG. 6 also shows how viewing/cleaning ports 24 may be located at or below the lowest level of filtration screens, so that they may be used to gain access to both the underside of filtration screens 16 and 18, and to bottom wall 26 of separator 10.

Figure 7:
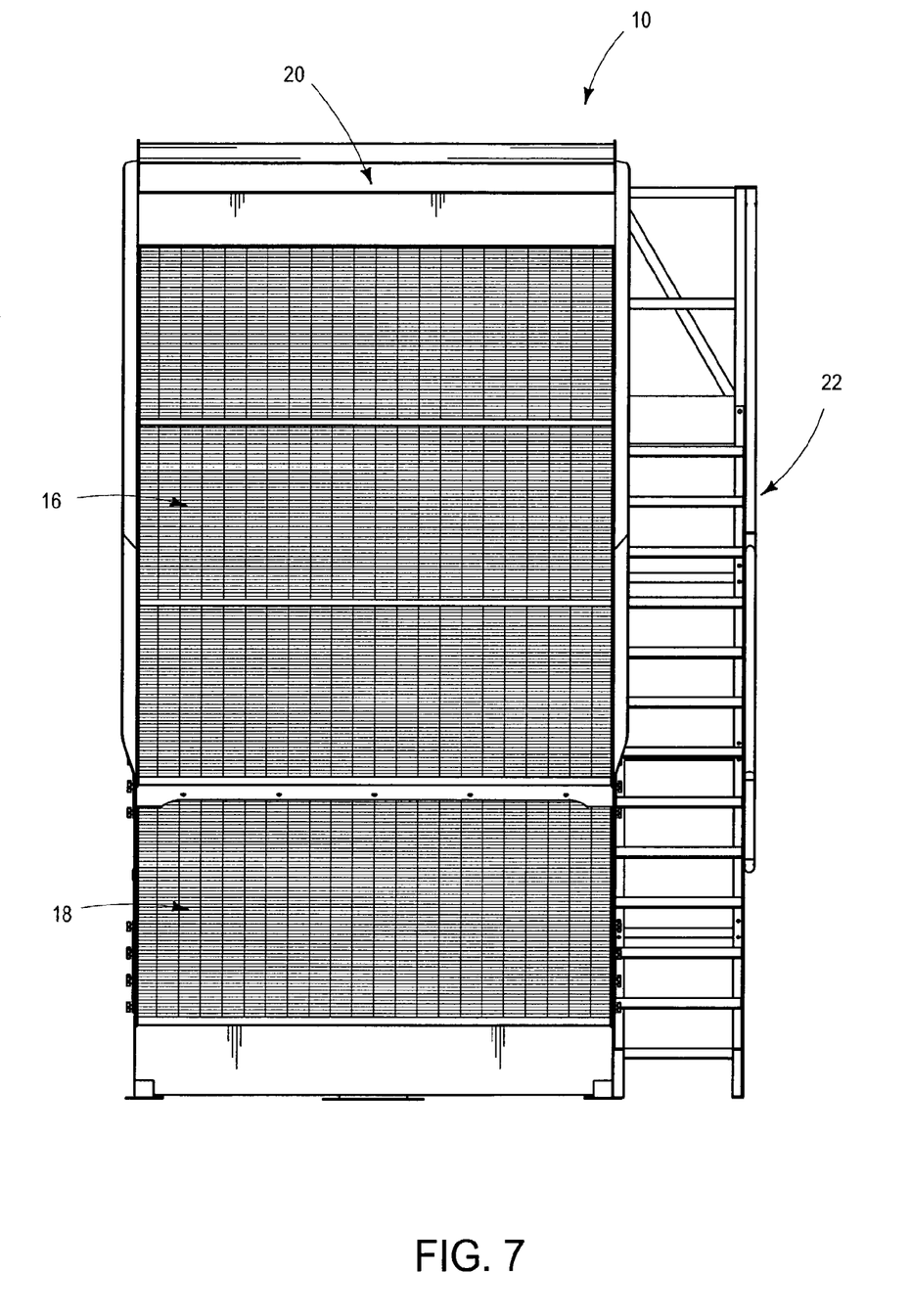
FIG. 7 is a front elevation of a sieve separator with filtration screens in place.
Figure 8:
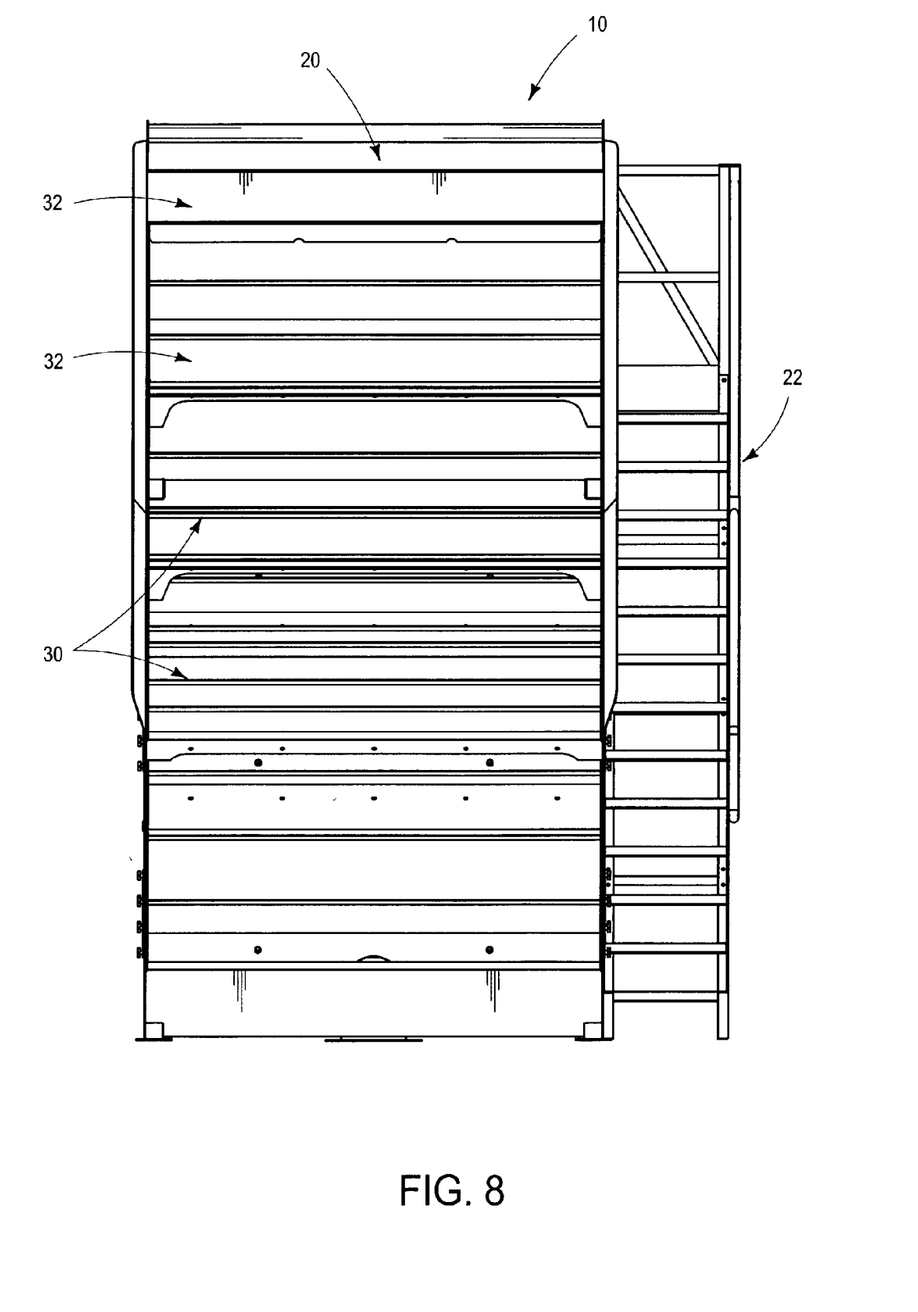
FIG. 8 is a front elevation of a sieve separator, where the filtration screens have been removed so that the underlying screen support structure may be seen.
Figure 9:
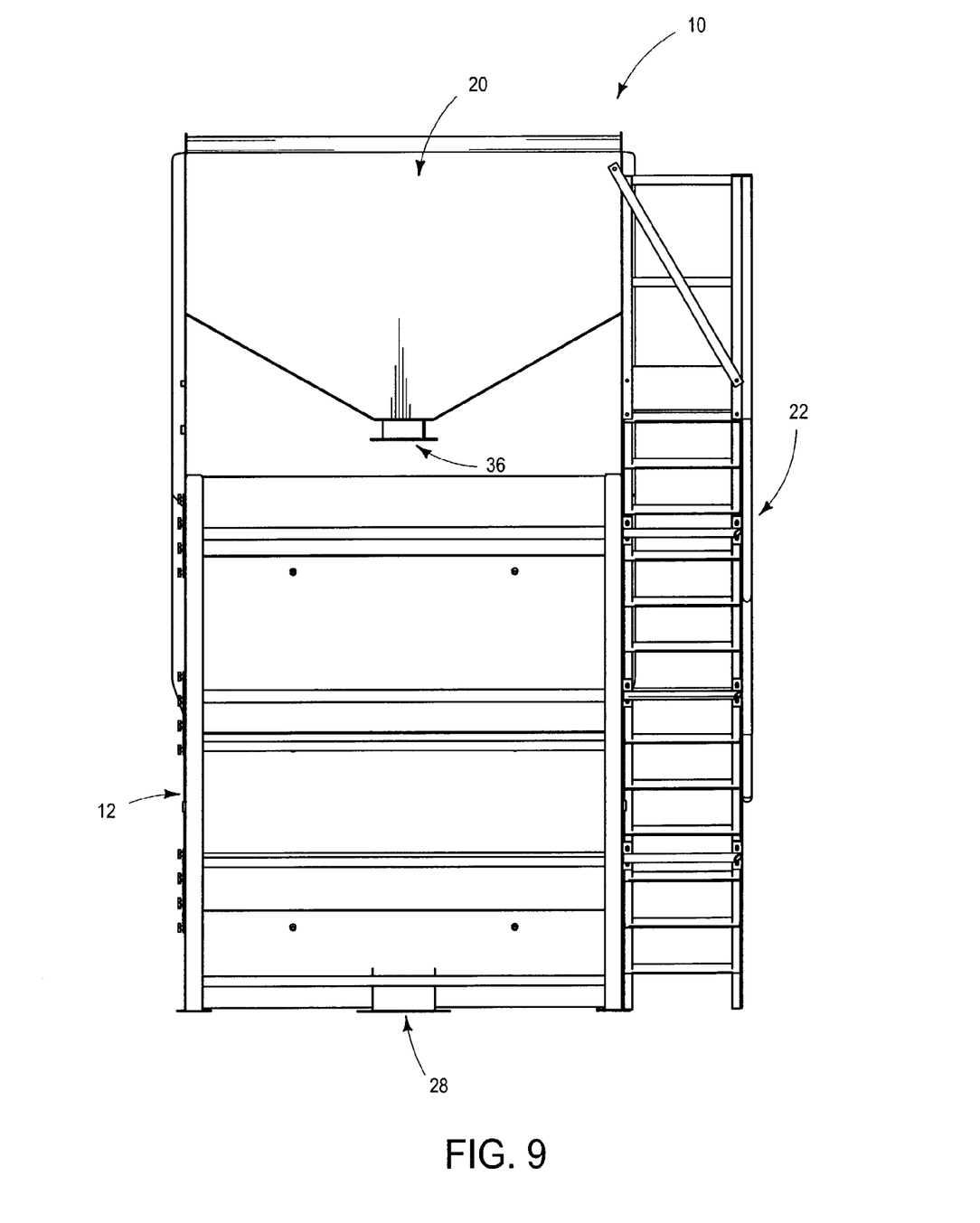
FIG. 9 is a front elevation of a sieve separator, where the filtration screens and bottom wall are represented as transparent so that the intake opening, outflow opening, and portions of the support structure may be seen.

In some embodiments of the invention, the two or more levels of filtration screens may be similar or identical to each other, with apertures that are either uniform or varying in size. In such embodiments, the separator functions much like a plurality of similar or identical conventional sloped-screen separators of the type known in the prior art. FIG. 7 shows a front elevation of a preferred embodiment of such a separator 10, comprising two levels of similar screens 16 and 18, where intake area 20 and stairs 22 are also shown. At a minimum, this system has the advantage that it only requires one support structure 12, and one mechanism to pump or otherwise deliver slurry into intake region 20, leading to a significant savings of construction time and expense compared to previous separators. FIG. 8 shows another front elevation of the same embodiment of separator 10, where the screens have been removed so that portions of support structure 12, including horizontal support members 30 and solid panels 32, may also be seen. FIG. 9 shows yet another front elevation of this embodiment, with the bottom wall removed so that additional portions of support structure 12, intake region 20, intake opening 36, and outflow opening 28 may be seen.

In other embodiments, the separator may comprise multiple sloped filtration screens with different aperture sizes on different levels, so that larger and smaller solids may be separated on distinct levels of the separator. In addition to the advantages already discussed, such embodiments have several other advantages over previous separators. First, by only separating the largest solids on the upper level filtration screens, the amount of clogging is drastically reduced, so that overflow and "streamers" may be partially or completely avoided. Furthermore, manure solids of various sizes may be kept separate from each other if so desired. Such separated solids stacks may be more compact due to their homogeneous nature, allowing for easier and more efficient removal of the solids and cleaning of the filtration screens.

Figure 10:
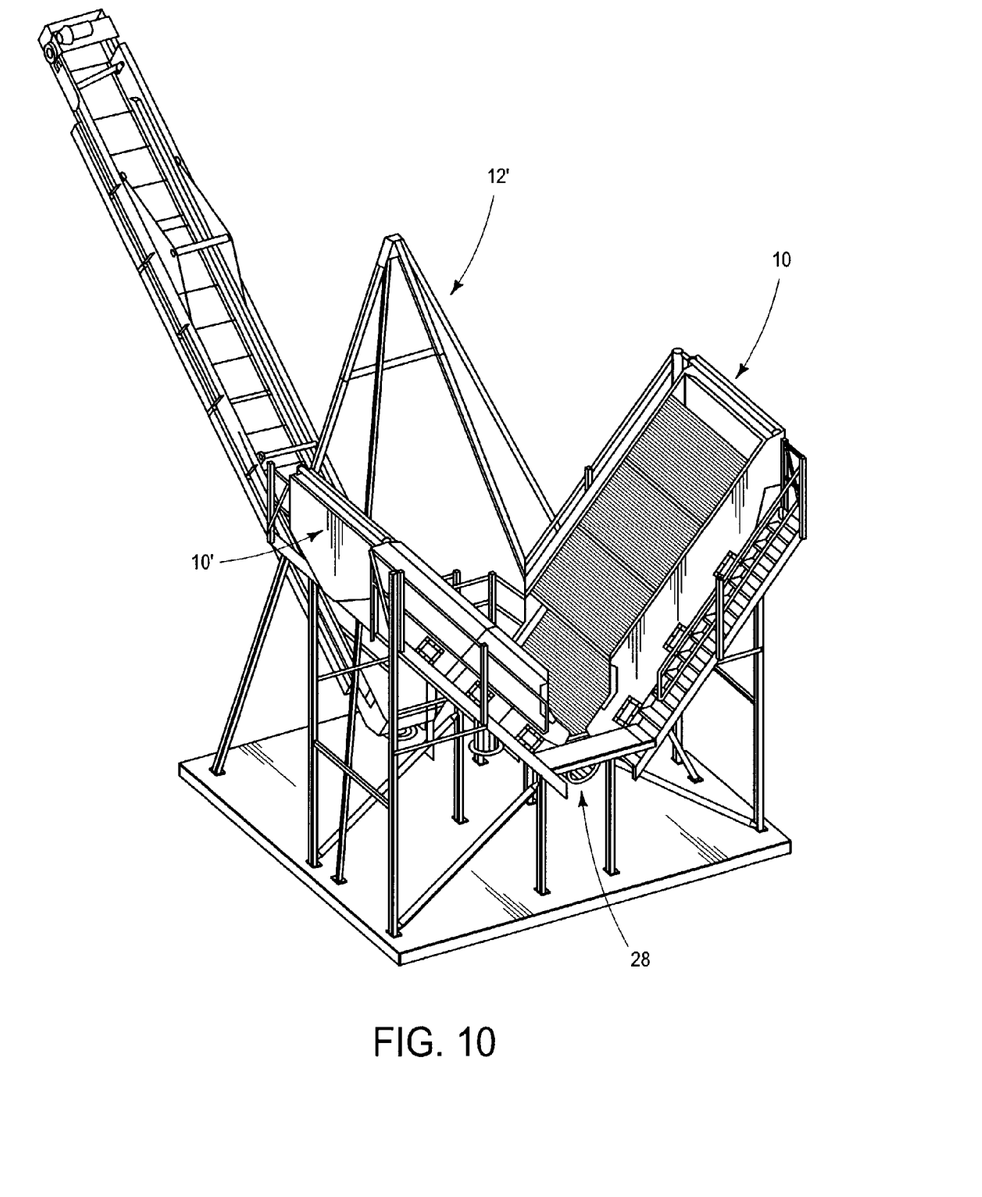
FIG. 10 is an isometric view of two sieve separators that have been joined to share a common outflow opening.

Separator 10 may be combined with another similar or identical separator, so that multiple manure slurries may be separated simultaneously, and the resulting liquid combined into a single entity that may be piped or otherwise transported to a slurry pond. In this way, several slurries may be separated at the same time, even if only one slurry pond exists. FIG. 10 shows two separators 10 and 10' that have been joined in this way using additional support structure 12', so that they comprise only a single slurry outflow opening 28, in accordance with aspects of the invention.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A sieve separator for separating manure slurry, comprising:
   a support structure;
   an intake opening in the support structure configured to receive manure slurry;
   at least two substantially parallel levels of filtration screens supported within the support structure at an incline with respect to the horizontal, each level including at least one filtration screen and a downwardly depending terminal edge, each filtration screen further including a plurality of apertures;
   wherein the levels are separated by a predetermined distance measured along a line perpendicular to the levels; and
   wherein the filtration screens are disposed such that the terminal edge of a lower level of filtration screens extends past the terminal edge of an upper level of filtration screens, relative to a vertical plane, such that the material passing over the terminal edge of the upper level of filtration screens falls on the lower level of filtration screens.

2. The sieve separator of claim 1, further comprising:
   a plurality of openable apertures located in the support structure, the openable apertures being configured to facilitate viewing and cleaning of the filtration screens by a human operator; and
   a set of stairs constructed adjacent to the support structure.

3. The sieve separator of claim 1, further comprising a plurality of sprayers configured to spray a substance, where the sprayers are positioned on the support structure such that a substance sprayed by the sprayers subsequently contacts manure slurry on at least one of the filtration screens.

4. The sieve separator of claim 3, wherein the sprayers are configured to spray air.

5. The sieve separator of claim 3, wherein the sprayers are configured to spray a liquid.

6. The sieve separator of claim 5, where the liquid is water.

7. The sieve separator of claim 5, where the liquid is an organic solvent.

8. The sieve separator of claim 5, where the liquid is a mixture of water and an organic solvent.

9. The sieve separator of claim 1, further comprising at least one solid panel disposed to cover a plurality of the apertures in at least one of the filtration screens.

10. The sieve separator of claim 1, further comprising at least one solid panel disposed relative to the filtration screens such that manure slurry passes over the solid panel before passing to at least one of the filtration screens.

11. The sieve separator of claim 1, where the apertures in the filtration screens are rectangular with a smallest dimension in the range from 0.005 inches to 0.120 inches.

12. The sieve separator of claim 1, where the apertures in one the filtration screens are rectangular with smallest dimension of length 0.06 inches, and where the apertures in the other filtration screen are rectangular with smallest dimension of length 0.02 inches.

13. The sieve separator of claim 1, wherein at least one of the filtration screens is configured to rotate away from the support structure.

14. The sieve separator of claim 13, where all of the filtration screens are configured to rotate away from the support structure.

15. The sieve separator of claim 13, where at least two of the filtration screens are connected so that they rotate about a common axis.

16. The sieve separator of claim 13, further comprising a plurality of sprayers configured to spray a substance, where the sprayers are located at points on the support structure generally disposed so that a substance sprayed by the sprayers, subsequently contacts at least one of the filtration screens.

17. The sieve separator of claim 13, further comprising at least one solid panel disposed relative to the filtration screens such that manure slurry passes over the solid panel before passing to at least one of the filtration screens.

18. The sieve separator of claim 13, where the apertures in the filtration screens are rectangular with smallest dimension in the range from 0.005 inches to 0.120 inches.

* * * * *